US012667998B2

(12) United States Patent
Noguchi et al.

(10) Patent No.: US 12,667,998 B2
(45) Date of Patent: Jun. 30, 2026

(54) METHOD AND DEVICE FOR RECYCLING CARBON FIBER-REINFORCED RESIN

(71) Applicant: HONDA MOTOR CO., LTD., Tokyo (JP)

(72) Inventors: Masato Noguchi, Saitama (JP); Mitsuharu Kan, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 562 days.

(21) Appl. No.: 18/173,090

(22) Filed: Feb. 23, 2023

(65) Prior Publication Data

US 2023/0302688 A1     Sep. 28, 2023

(30) Foreign Application Priority Data

Mar. 25, 2022     (CN) ......................... 202210307549.X

(51) Int. Cl.
| | |
|---|---|
| *B29B 17/02* | (2006.01) |
| *B09B 3/40* | (2022.01) |
| *B09B 101/00* | (2022.01) |
| *B29K 63/00* | (2006.01) |
| *B29K 307/04* | (2006.01) |
| *B29L 31/00* | (2006.01) |

(52) U.S. Cl.
CPC ............ *B29B 17/0206* (2013.01); *B09B 3/40* (2022.01); *B09B 2101/007* (2022.01); *B29K*

*2063/00* (2013.01); *B29K 2307/04* (2013.01); *B29L 2031/7172* (2013.01)

(58) Field of Classification Search
CPC ........ B29B 17/0206; B29B 2017/0496; B29B 17/04; B09B 3/40; B09B 2101/007; B29K 2063/00; B29K 2307/04; B29K 2105/10; B29L 2031/7172; Y02W 30/62; C08J 11/00
See application file for complete search history.

(56) References Cited

U.S. PATENT DOCUMENTS

2022/0162072 A1*     5/2022  Urayama ............ B29B 17/0206

FOREIGN PATENT DOCUMENTS

WO          2020179915 A1      9/2020

* cited by examiner

*Primary Examiner* — Daniel C. Mccracken
(74) *Attorney, Agent, or Firm* — CKC & PARTNERS CO., LLC

(57)          ABSTRACT
A method for recycling a carbon fiber-reinforced resin including a carbon fiber and a matrix resin is provided, and the method includes: a first heating step of heating the carbon fiber-reinforced resin to decompose the matrix resin so as to obtain an intermediate in which the decomposition residue of the matrix resin is adhered to the carbon fiber; an unwinding step of unwinding an intermediate fiber from the intermediate; a second heating step of heating the unwound intermediate fiber to decompose the decomposition residue of the matrix resin adhered to the intermediate fiber so as to obtain a recycled carbon fiber; and a winding step of winding the recycled carbon fiber.

8 Claims, 5 Drawing Sheets

10

METHOD AND DEVICE FOR RECYCLING CARBON FIBER-REINFORCED RESIN

This application is based on and claims the benefit of priority from Chinese Patent Application No. CN202210307549.X, filed on 25 Mar. 2022, the content of which is incorporated herein by reference.

BACKGROUND OF THE INVENTION

Field of the Invention

The present invention relates to methods and devices for recycling a carbon fiber-reinforced resin.

Related Art

In recent years, research and development of fuel cell systems which contribute to energy efficiency has been conducted so that more people can secure access to affordable, reliable, sustainable and advanced energy.

Here, in a high-pressure hydrogen tank for storing hydrogen which is supplied to a fuel cell, for example, a liner is covered by a carbon fiber-reinforced resin, and the carbon fiber-reinforced resin includes a carbon fiber and a matrix resin.

PCT International Publication No. WO2020/179915 discloses a method of recycling for a high-pressure hydrogen tank. Specifically, a dry distillation furnace is first used to heat the high-pressure hydrogen tank, and thus a matrix resin is dry-distilled, with the result that a recycled carbon material with fixed carbon adhered to a carbon fiber is generated. Then, the recycled carbon material is cut into a predetermined size, and a continuous furnace is thereafter used to oxidize the fixed carbon, with the result that a recycled carbon fiber is generated.

Patent Document 1: PCT International Publication No. WO2020/179915

SUMMARY OF THE INVENTION

However, handleability when the long fiber of the recycled carbon fiber is manufactured is lowered.

An object of the present invention is to provide a method and a device for recycling a carbon fiber-reinforced resin which can enhance handleability when the long fiber of a recycled carbon fiber is manufactured.

According to an aspect of the present invention, a method for recycling a carbon fiber-reinforced resin including a carbon fiber and a matrix resin is provided, and the method includes: a first heating step of heating the carbon fiber-reinforced resin to decompose the matrix resin so as to obtain an intermediate in which the decomposition residue of the matrix resin is adhered to the carbon fiber; an unwinding step of unwinding an intermediate fiber from the intermediate; a second heating step of heating the unwound intermediate fiber to decompose the decomposition residue of the matrix resin adhered to the intermediate fiber so as to obtain a recycled carbon fiber; and a winding step of winding the recycled carbon fiber.

The first heating step may include: a first step of decomposing the matrix resin at a temperature equal to or greater than the thermal decomposition start temperature of the matrix resin and equal to or less than the flash point of the thermal decomposition gas of the matrix resin; and a second step of decomposing the matrix resin decomposed in the first step at a temperature equal to or greater than the thermal oxidative decomposition start temperature of the decomposition residue of the matrix resin and equal to or less than the thermal decomposition start temperature of the carbon fiber.

The carbon fiber-reinforced resin may be included in a tank.

According to another aspect of the present invention, a device for recycling a carbon fiber-reinforced resin including a carbon fiber and a matrix resin is provided, and the device includes: a heat treatment furnace that heats the carbon fiber-reinforced resin to decompose the matrix resin so as to obtain an intermediate in which the decomposition residue of the matrix resin is adhered to the carbon fiber; an unwinder that unwinds an intermediate fiber from the intermediate; a tubular furnace that heats the unwound intermediate fiber to decompose the decomposition residue of the matrix resin adhered to the intermediate fiber so as to obtain a recycled carbon fiber; and a winder that winds the recycled carbon fiber.

The device for recycling a carbon fiber-reinforced resin may further include: a mass detector that detects the mass of the carbon fiber-reinforced resin in the heat treatment furnace.

The carbon fiber-reinforced resin may be included in a tank.

The device for recycling a carbon fiber-reinforced resin may further include: a rotator that rotates the tank in the heat treatment furnace.

The rotator may include a rotation shaft in a substantially horizontal direction.

According to the present invention, it is possible to provide a method and a device for recycling a carbon fiber-reinforced resin which can enhance handleability when the long fiber of a recycled carbon fiber is manufactured.

DETAILED DESCRIPTION OF THE INVENTION

Figure 1:
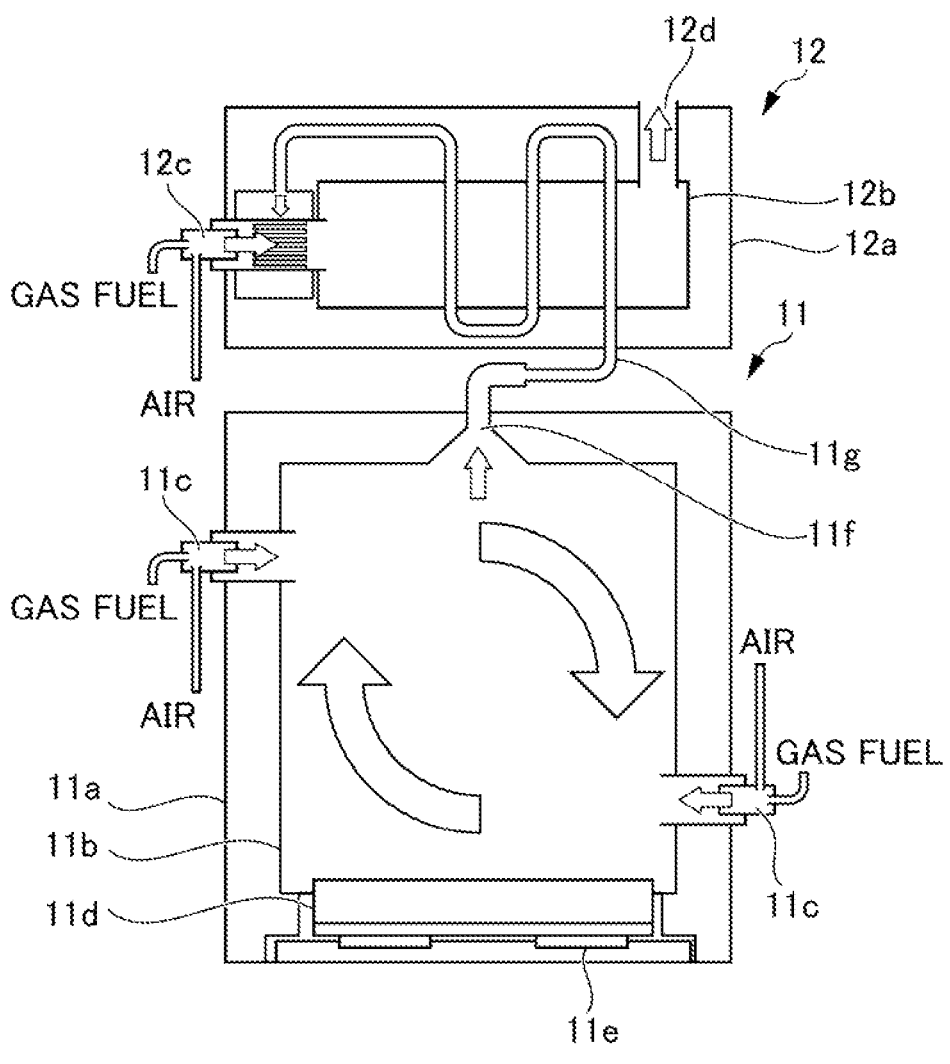
FIG. 1 is a diagram showing an example of a heat treatment furnace.

An embodiment of the present invention will be described below with reference to drawings.

A method for recycling a carbon fiber-reinforced resin in the present embodiment is a method for recycling a carbon fiber-reinforced resin which includes a carbon fiber and a matrix resin. Specifically, the method for recycling a carbon fiber-reinforced resin in the present embodiment includes: a first heating step of heating the carbon fiber-reinforced resin to decompose the matrix resin so as to obtain an intermediate in which the decomposition residue of the matrix resin is adhered to the carbon fiber; an unwinding step of unwinding an intermediate fiber from the intermediate; a second heating step of heating the unwound intermediate fiber to decompose the decomposition residue of the matrix resin adhered to the intermediate fiber so as to obtain a recycled carbon fiber; and a winding step of winding the recycled carbon fiber. Here, in the intermediate, the decomposition residue of the matrix resin is adhered to the carbon fiber, and thus handleability when the intermediate fiber is unwound is enhanced. On the other hand, in the recycled carbon fiber, the decomposition residue of the matrix resin adhered to the intermediate fiber is decomposed, and thus the purity of the carbon fiber is increased. As compared with the intermediate fiber, the recycled carbon fiber is flexible or soft, and thus handleability when the recycled carbon fiber is wound is enhanced. Consequently, handleability when the long fiber of the recycled carbon fiber is manufactured is enhanced.

Although the carbon fiber is not particularly limited, examples thereof include a polyacrylonitrile (PAN)-based carbon fiber, a pitch-based carbon fiber and the like.

Although the fiber length of the carbon fiber and the recycled carbon fiber is not particularly limited, for example, the fiber length is equal to or greater than 1 m.

Although the matrix resin is not particularly limited, examples thereof include a thermosetting resin such as an epoxy resin, a thermoplastic resin and the like.

The first heating step preferably includes: a first step of decomposing the matrix resin at a temperature equal to or greater than the thermal decomposition start temperature of the matrix resin and equal to or less than the flash point of the thermal decomposition gas of the matrix resin; and a second step of decomposing the matrix resin decomposed in the first step at a temperature equal to or greater than the thermal oxidative decomposition start temperature of the decomposition residue of the matrix resin and equal to or less than the thermal decomposition start temperature of the carbon fiber. In this way, overheating caused by combustion of the thermal decomposition gas of the matrix resin and degradation of the carbon fiber are suppressed.

When the matrix resin is an epoxy resin, for example, in the first step, the heating is performed at a temperature equal to or greater than 330° C. and equal to or less than 360° C., and in the second step, the heating is performed at a temperature equal to or greater than 430° C. and equal to or less than 470° C. In this case, examples of the thermal decomposition gas include bisphenol A, phenol and the like.

The heating temperature in the first heating step is not particularly limited as long as the intermediate in which the decomposition residue of the matrix resin is adhered to the carbon fiber can be obtained.

Conditions under which the intermediate fiber is unwound from the intermediate in the unwinding step are not particularly limited.

The heating temperature in the second heating step is preferably equal to or greater than the heating temperature in the first heating step. In this way, the decomposition residue of the matrix resin adhered to the intermediate fiber is easily decomposed. On the other hand, the heating temperature in the second heating step is preferably equal to or less than the thermal decomposition start temperature of the carbon fiber. In this way, the degradation of the carbon fiber is suppressed.

Conditions under which the recycled carbon fiber is wound in the winding step are not particularly limited.

The recycled fiber which has been sized may be wound.

Specific examples of the fiber-reinforced plastic to be recycled include known high-pressure hydrogen tanks (types 2 to 4) and the like.

In the high-pressure hydrogen tank, a liner is covered by the carbon fiber-reinforced resin. Although the material of the liner is not particularly limited, examples thereof include chrome-molybdenum steel, aluminum, polyamide, polyethylene and the like.

A device for recycling a carbon fiber-reinforced resin in the present embodiment includes: a heat treatment furnace that heats the carbon fiber-reinforced resin to decompose the matrix resin so as to obtain an intermediate in which the decomposition residue of the matrix resin is adhered to the carbon fiber; an unwinder that unwinds an intermediate fiber from the intermediate; a tubular furnace that heats the unwound intermediate fiber to decompose the decomposition residue of the matrix resin adhered to the intermediate fiber so as to obtain a recycled carbon fiber; and a winder that winds the recycled carbon fiber. The device for recycling a carbon fiber-reinforced resin in the present embodiment may further include, as necessary, a sizing portion which sizes the recycled carbon fiber, a feed mechanism which controls the linear speed of the recycled carbon fiber and the like.

FIG. 1 shows an example of a heat treatment furnace.

The heat treatment furnace 10 includes a heat treatment chamber 11 and a combustion chamber 12.

The heat treatment chamber 11 is a sealed space which is surrounded by an outer wall 11a and an inner wall 11b. In the heat treatment chamber 11, burners 11c are provided at an upper portion of the outer wall 11a on the left side and at a lower portion of the outer wall 11a on the right side in the figure such that a combustion gas flows into the inner wall 11b. Hence, when a gas fuel and air are mixed to be burned by the burners 11c, the combustion gas is convected within the inner wall 11b, and thus the temperature within the inner wall 11b is stable.

In the heat treatment chamber 11, a sealing door for storing the carbon fiber-reinforced resin is installed in parts of the outer wall 11a and the inner wall 11b. Here, the carbon fiber-reinforced resin is placed on a heat insulating material 11d which is provided to penetrate the bottom surface of the inner wall 11b. A load cell 11e serving as a mass detector is provided between the bottom surface of the outer wall 11a and the heat insulating material 11d, and detects, based on the amount of distortion, the mass of the carbon fiber-reinforced resin in real time. In this way, heating conditions in the heat treatment chamber 11 are optimized, and thus variations in the content of the decomposition residue of the matrix resin in the intermediate caused by individual differences in the material, the shape and the like of the carbon fiber-reinforced resin are suppressed, with the result that control accuracy is enhanced. Since a heating time in the heat treatment chamber 11 does not need to be prolonged beyond necessity, this contributes to the reduction of the heating time and the reduction of energy consumption.

The mass detector may detect, in real time, the amount of mass of the carbon fiber-reinforced resin which is reduced. As necessary, the mass detector may be omitted.

The decomposition gas of the matrix resin generated within the inner wall 11b is discharged from a discharge port 11f formed at an upper portion of the inner wall 11b in the figure and is thereafter introduced into the combustion chamber 12 via a pipe 11g which is provided to penetrate the outer wall 11a.

The combustion chamber 12 is a sealed space which is surrounded by an outer wall 12a and an inner wall 12b. In the combustion chamber 12, a burner 12c is provided at a center portion of the outer wall 12a on the left side in the figure such that a combustion gas flows into the inner wall 12b. On the other hand, the pipe 11g penetrates the outer wall 12a, then penetrates the inside and outside of the inner wall 12*b* within the outer wall 12*a* and is finally connected to an upper left portion of the inner wall 12*b* in the figure. Here, the decomposition gas of the matrix resin is heated by the combustion gas flowing within the inner wall 12*b* while passing through the pipe 11*g* within the inner wall 12*b*, is thereafter introduced from the upper left portion of the inner wall 12*b* and is brought into contact with the combustion gas. In this way, the decomposition gas of the matrix resin is burned and is thereafter discharged from a discharge port 12*d* to the outside.

A case where the carbon fiber-reinforced resin included in the high-pressure hydrogen tank is recycled will be described below.

Figure 2A:
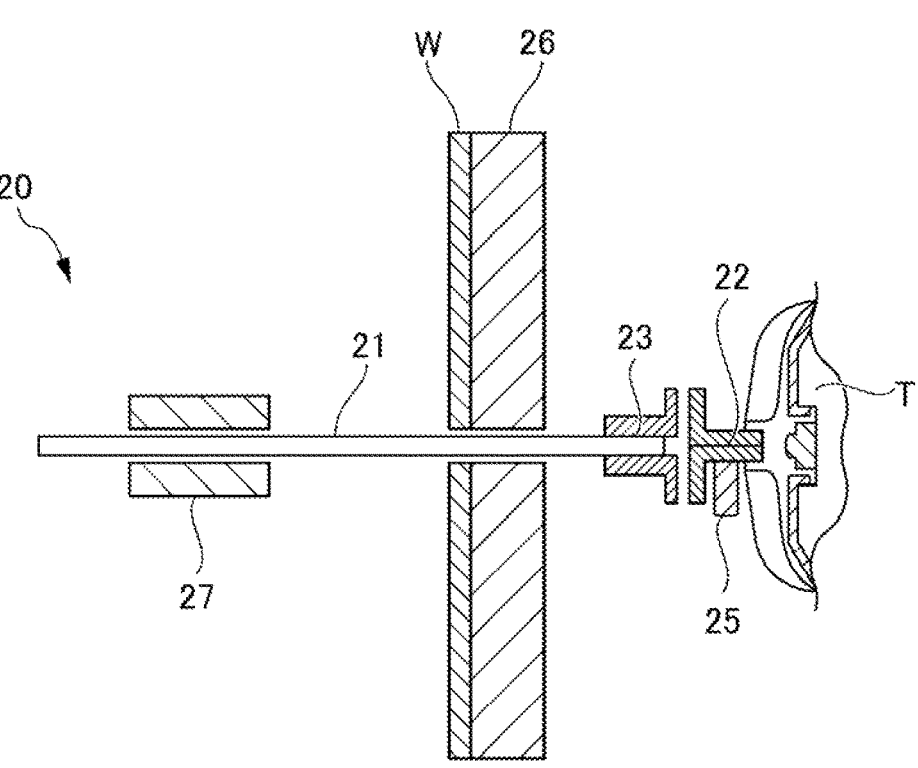
FIGS. 2A and 2B are diagrams showing an example of a rotator which rotates a high-pressure hydrogen tank in a heat treatment chamber.
Figure 2B:
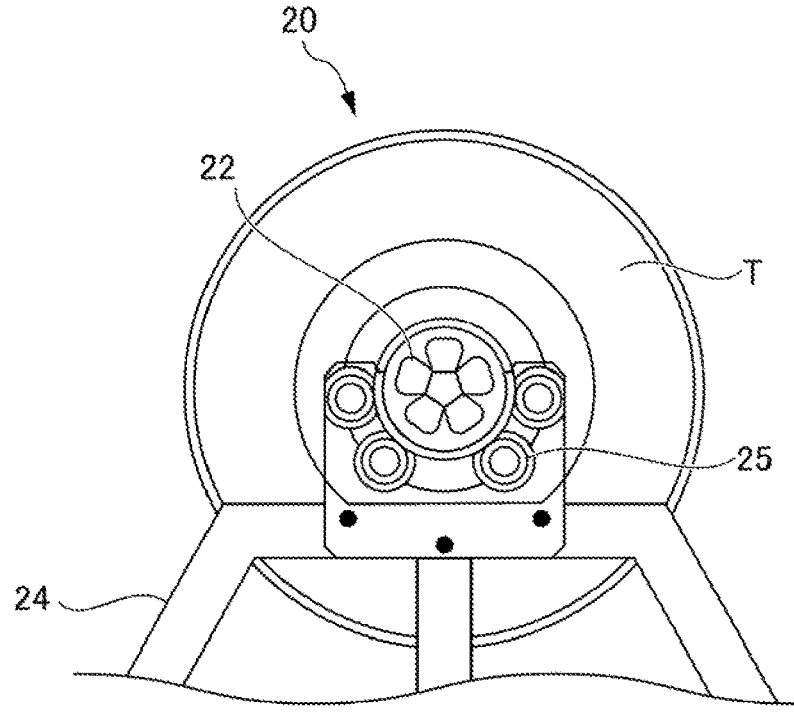

FIGS. 2A and 2B show an example of a rotator which rotates the high-pressure hydrogen tank in the heat treatment chamber. FIGS. 2A and 2B are a cross-sectional view and a side view, respectively.

In the rotator 20, a rotation shaft 21 in a substantially horizontal direction penetrates the wall portion W of the heat treatment chamber, and thus the temperature distribution of the carbon fiber-reinforced resin in an up/down direction in the figure is uniformized.

The rotation shaft 21 may extend in a direction other than a substantially horizontal direction, and may extend, for example, in a substantially vertical direction. When the rotation shaft 21 extends in a substantially vertical direction, the temperature distribution of the carbon fiber-reinforced resin in the heat treatment chamber is uniformized to the same degree as in the case where the rotation shaft 21 extends in a substantially horizontal direction.

The high-pressure hydrogen tank T is connected to the rotation shaft 21 via a flanged jig 22 utilizing a base shape and a rotation shaft flange 23. Here, the flanged jig 22 and the rotation shaft flange 23 are fixed with bolts, nuts and the like. The high-pressure hydrogen tank T is placed on a mount 24, and bearings 25 are provided in the mount 24. Furthermore, on the inner side of the wall portion W of the heat treatment furnace, a heat insulating material 26 is provided. On the outer side of the wall portion W of the heat treatment furnace, a motor for rotating the rotation shaft 21 is provided, and a cooling jacket 27 is provided around the rotation shaft 21.

Figure 3A:
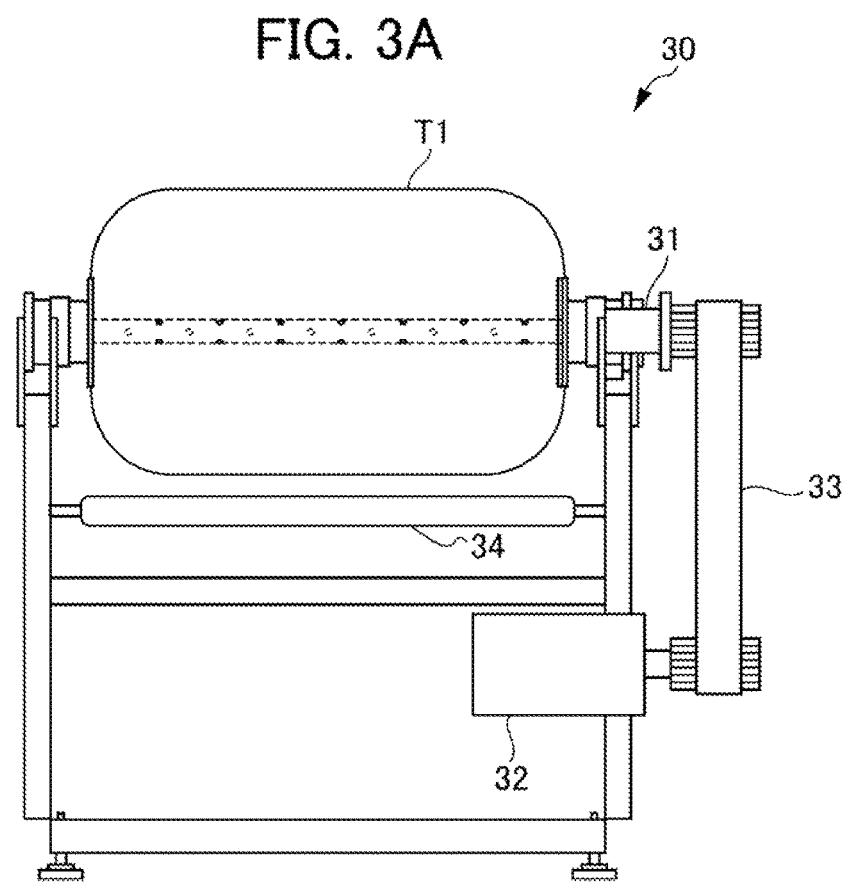
FIGS. 3A and 3B are diagrams showing an example of an unwinder which unwinds an intermediate fiber from an intermediate included in the high-pressure hydrogen tank.
Figure 3B:
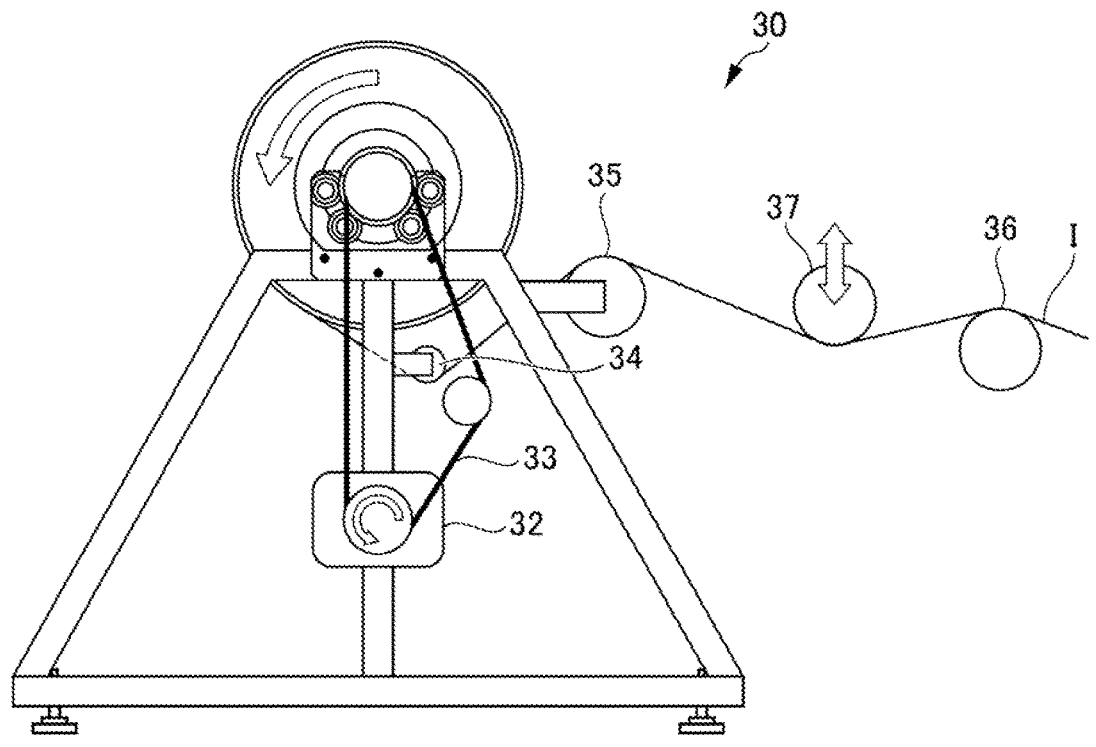

FIGS. 3A and 3B show an example of the unwinder which unwinds the intermediate fiber from the intermediate included in the high-pressure hydrogen tank. FIGS. 3A and 3B are a front view and a side view, respectively.

The unwinder 30 includes: a rotary jig 31 which rotatably supports the high-pressure hydrogen tank T1 including the intermediate; and a motor 32 which has rotation power for unwinding the intermediate fiber I. The rotation power of the motor 32 propagates to the rotary jig 31 via a belt 33. Consequently, the intermediate fiber I is unwound via rollers 34 to 36. Here, the roller 34 is arranged such that the intermediate fiber I is unwound to the outside of a tangent at a position from which the intermediate fiber I of the high-pressure hydrogen tank T1 is unwound. The rollers 34 to 36 each have a long axis corresponding to unwinding in the longitudinal direction of the high-pressure hydrogen tank T1. Furthermore, a dancer roller 37 for controlling an unwinding tension is provided in order to absorb a difference in the amount of unwinding per revolution between hoop winding and helical winding.

Instead of the roller 34, a blade may be provided.

Figure 4:
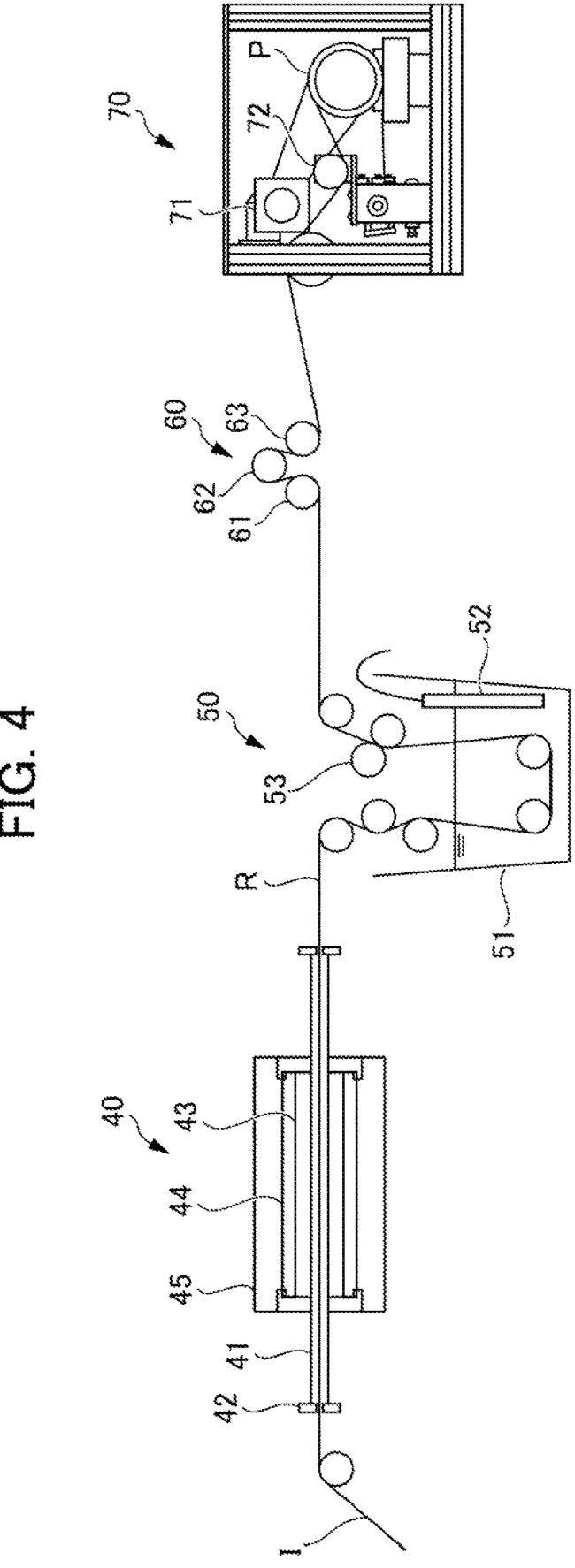
FIG. 4 is a diagram showing an example of a tubular furnace, a sizing portion, a feed mechanism and a winder.

FIG. 4 shows an example of the tubular furnace, the sizing portion, the feed mechanism and the winder.

In the tubular furnace 40, a heat-insulating lid 42 is provided, and in the heat-insulating lid 42, through holes through which the intermediate fiber I can pass are formed at both ends of a quartz tube 41. In the tubular furnace 40, a heating wire 43, a heat insulating material 44 and a protective cover 45 are sequentially provided in a center portion of the quartz tube 41. Hence, current is applied to the heating wire 43 to heat the intermediate fiber I, and thus the decomposition residue of the matrix resin adhered to the intermediate fiber I is decomposed, with the result that the recycled carbon fiber R is obtained. Here, the temperature distribution within the tubular furnace 40 is uniformized, and moreover, heating of parts other than the intermediate fiber I is suppressed.

In the sizing portion 50, the recycled carbon fiber R is passed into a sizing liquid 51. Here, the sizing liquid 51 is heated by a heater 52. A roller 53 prevents excessive coating on the recycled carbon fiber R with the sizing liquid 51.

As necessary, a drying furnace may be provided to dry the recycled carbon fiber R.

The feed mechanism 60 includes feeder rollers 61 to 63, utilizes friction between the feeder rollers 61 to 63 and the recycled carbon fiber R and thereby controls the linear speed of the recycled carbon fiber R such that the linear speed is easily controlled in the step.

The winder 70 includes: a winding motor 71 for winding the recycled carbon fiber R on a paper core P; and a slide roller 72 for performing traverse winding on the recycled carbon fiber R. Here, the torque of the winding motor 71 is controlled, and thus the winding tension of the recycled carbon fiber R is controlled.

Although the embodiment of the present invention has been described above, the present invention is not limited to the embodiment described above, and the embodiment described above may be changed as necessary without departing from the spirit of the present invention.

EXAMPLES

Although Example of the present invention will be described below, the present invention is not limited to Example below.

Example 1

The device (see FIGS. 1 to 4) for recycling a carbon fiber-reinforced resin was used, and thus a carbon fiber-reinforced resin included in the high-pressure hydrogen tank (type 2) was recycled under the following conditions, with the result that a recycled carbon fiber was obtained. Consequently, handleability when an intermediate fiber was unwound and handleability when the recycled carbon fiber was wound were satisfactory.

Carbon fiber: PAN-based carbon fiber

Matrix resin: epoxy resin

Figure 5:
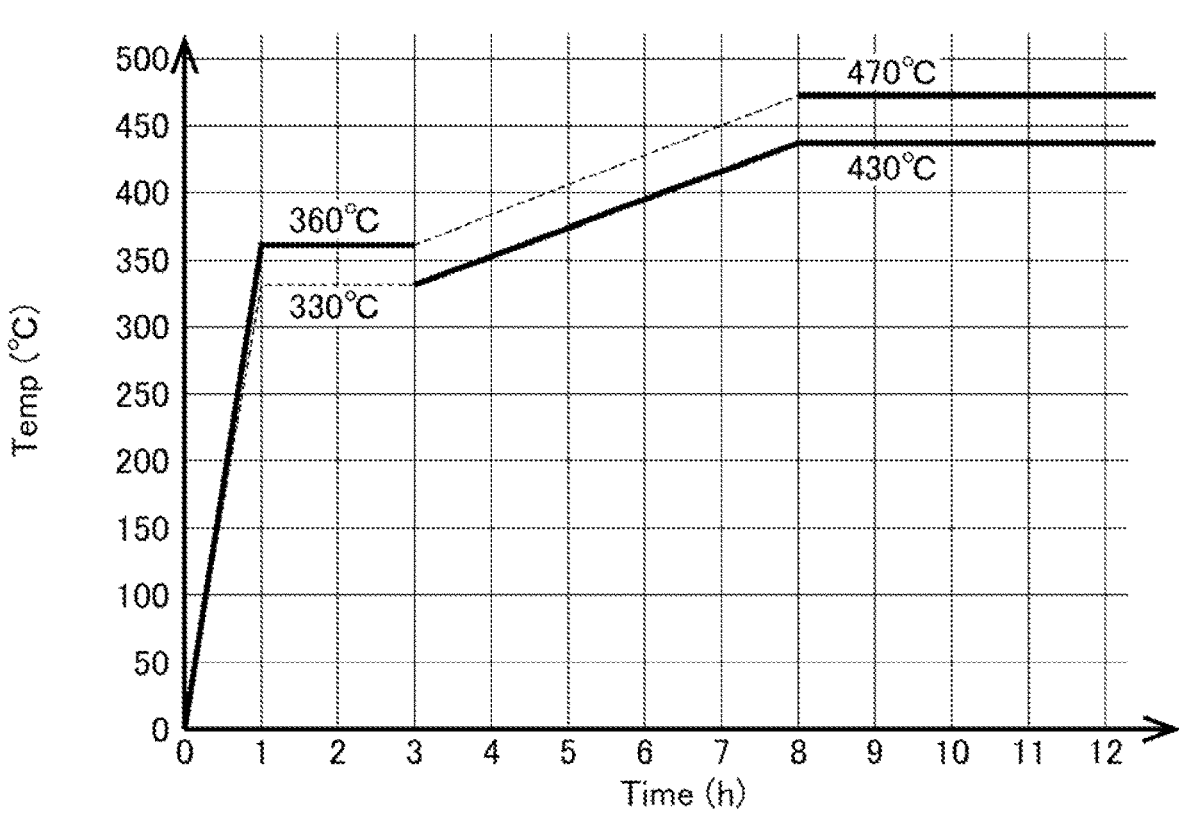
FIG. 5 is a graph showing a heating profile in the heat treatment furnace of Example 1.

Heating profile in heat treatment furnace (see FIG. 5)

Content of decomposition residue of matrix resin in intermediate: 5% by mass

Heating temperature in tubular furnace: 460° C.

Comparative Example 1

When the content of the decomposition residue of the matrix resin in the intermediate was set to 0% by mass, the intermediate fiber was entangled, and thus the intermediate fiber was not able to be unwound.

EXPLANATION OF REFERENCE NUMERALS

10 heat treatment furnace
11 heat treatment chamber

11*a* outer wall
11*b* inner wall
11*c* burner
11*d* heat insulating material
11*e* load cell
11*f* discharge port
11*g* pipe
12 combustion chamber
12*a* outer wall
12*b* inner wall
12*c* burner
12*d* discharge port
20 rotator
21 rotation shaft
22 flanged jig
23 rotation shaft flange
24 mount
25 bearings
26 heat insulating material
27 cooling jacket
T high-pressure hydrogen tank
W wall portion of heat treatment furnace
30 unwinder
31 rotary jig
32 motor
33 belt
34 to 36 roller
37 dancer roller
T1 high-pressure hydrogen tank
40 tubular furnace
41 quarts tube
42 heat-insulating lid
43 heating wire
44 heat insulating material
45 protective cover
R recycled carbon fiber
50 sizing portion
51 sizing liquid
52 heater
53 roller
60 feed mechanism
61 to 63 feeder roller
70 winder
71 winding motor
72 slide roller
P paper core

What is claimed is:

1. A method for recycling a carbon fiber-reinforced resin including a carbon fiber and a matrix resin, the method comprising:

a first heating step of heating, in a heat treatment furnace, the carbon fiber-reinforced resin to decompose the matrix resin so as to obtain an intermediate in which a decomposition residue of the matrix resin is adhered to the carbon fiber;

an unwinding step of unwinding an intermediate fiber from the intermediate;

a second heating step of heating the unwound intermediate fiber to decompose the decomposition residue of the matrix resin adhered to the intermediate fiber so as to obtain a recycled carbon fiber; and a winding step of winding the recycled carbon fiber.

2. The method for recycling a carbon fiber-reinforced resin according to claim 1, wherein the first heating step comprises: a first step of decomposing the matrix resin for 1.5 hours or more at a temperature equal to or greater than a thermal decomposition start temperature of the matrix resin and equal to or less than a flash point of a thermal decomposition gas of the matrix resin; and a second step of decomposing the matrix resin decomposed in the first step at a temperature equal to or greater than a thermal oxidative decomposition start temperature of the decomposition residue of the matrix resin and equal to or less than a thermal decomposition start temperature of the carbon fiber.

3. The method for recycling a carbon fiber-reinforced resin according to claim 1, wherein the carbon fiber-reinforced resin is included in a tank.

4. A device for recycling a carbon fiber-reinforced resin including a carbon fiber and a matrix resin, the device comprising:

a heat treatment furnace that heats the carbon fiber-reinforced resin to decompose the matrix resin so as to obtain an intermediate in which a decomposition residue of the matrix resin is adhered to the carbon fiber;

an unwinder that unwinds an intermediate fiber from the intermediate;

a tubular furnace that heats the unwound intermediate fiber to decompose the decomposition residue of the matrix resin adhered to the intermediate fiber so as to obtain a recycled carbon fiber; and a winder that winds the recycled carbon fiber.

5. The device for recycling a carbon fiber-reinforced resin according to claim 4, further comprising: a mass detector that detects a mass of the carbon fiber-reinforced resin in the heat treatment furnace.

6. The device for recycling a carbon fiber-reinforced resin according to claim 4, wherein the carbon fiber-reinforced resin is included in a tank.

7. The device for recycling a carbon fiber-reinforced resin according to claim 6, further comprising: a rotator that rotates the tank in the heat treatment furnace.

8. The device for recycling a carbon fiber-reinforced resin according to claim 7, wherein the rotator comprises a rotation shaft in a substantially horizontal direction.

* * * * *